(12) United States Patent
Han

(10) Patent No.: US 9,829,162 B2
(45) Date of Patent: Nov. 28, 2017

(54) STRING LAMP

(71) Applicant: DONGGUAN FAYEUNG LIGHTING CO., LTD., Dongguan, Guangdong (CN)

(72) Inventor: Houhua Han, Suizhou (CN)

(73) Assignee: DONGGUAN FAYEUNG LIGHTING CO., LTD., Dongguan (CN)

( * ) Notice: Subject to any disclaimer, the term of this patent is extended or adjusted under 35 U.S.C. 154(b) by 351 days.

(21) Appl. No.: 14/467,147

(22) Filed: Aug. 25, 2014

(65) Prior Publication Data

US 2015/0103540 A1 Apr. 16, 2015

(30) Foreign Application Priority Data

Oct. 14, 2013 (CN) .................... 2013 2 0630110 U

(51) Int. Cl.
| | |
|---|---|
| *H01R 33/00* | (2006.01) |
| *F21S 4/00* | (2016.01) |
| *F21S 4/10* | (2016.01) |
| *F21W 121/00* | (2006.01) |
| *F21W 131/10* | (2006.01) |
| *F21W 131/30* | (2006.01) |
| *H01G 2/14* | (2006.01) |
| *H01G 9/00* | (2006.01) |
| *H01G 9/12* | (2006.01) |
| *F21V 23/00* | (2015.01) |

(52) U.S. Cl.
CPC ................. *F21S 4/001* (2013.01); *F21S 4/10* (2016.01); *F21V 23/00* (2013.01); *F21W 2121/00* (2013.01); *F21W 2131/10* (2013.01); *F21W 2131/30* (2013.01); *H01G 2/14* (2013.01); *H01G 9/0003* (2013.01); *H01G 9/12* (2013.01)

(58) Field of Classification Search
CPC .... F21S 4/10; H01G 2/14; H01G 9/12; H01G 9/0003
USPC .............. 362/654; 361/520, 538, 773, 301.3, 361/308.1, 310, 518; 439/699.2
See application file for complete search history.

(56) References Cited

U.S. PATENT DOCUMENTS

| | | | | |
|---|---|---|---|---|
| 3,669,302 A | * | 6/1972 | Markarian | ............... H01G 9/12 220/203.08 |
| 4,004,199 A | * | 1/1977 | Pearce | .................... H01G 9/12 174/522 |
| 4,972,299 A | * | 11/1990 | Hagiwara | ............... H01G 2/06 361/540 |

(Continued)

*Primary Examiner* — Bryon T Gyllstrom
*Assistant Examiner* — James Endo

(57) ABSTRACT

The present invention relates to a string lamp. The string lamp includes a bulb, a lamp holder, a hollow connecting base and a capacitor embedded in the connecting base in a separable mode. A lower part of the bulb is contained in the lamp holder. At least two lamp pins extend out from wire holes formed in the lower part of the lamp holder. The inner side wall of the connecting base is provided with at least two separately arranged conductive pieces, and the conductive pieces are electrically contacted with the corresponding lamp pins. The capacitor is arranged below the lamp holder, and connecting pins of the capacitor are electrically contacted with the corresponding conductive pieces as well. The string lamp of the present invention is compact in structure, and the capacitor and the lamp holder are convenient to maintain and replace.

11 Claims, 8 Drawing Sheets

(56) References Cited

U.S. PATENT DOCUMENTS

| | | | | |
|---|---|---|---|---|
| 4,992,910 | A * | 2/1991 | Evans | H01G 9/12 361/502 |
| 5,580,358 | A * | 12/1996 | Narusawa | H01G 9/10 29/25.03 |
| 5,769,907 | A * | 6/1998 | Fukuda | H01G 9/15 29/25.03 |
| 5,880,581 | A | 3/1999 | Yang | |
| 6,053,774 | A * | 4/2000 | Lin | H01K 7/06 439/619 |
| 6,079,848 | A * | 6/2000 | Ahroni | F21V 21/002 362/249.01 |
| 6,283,797 | B1 * | 9/2001 | Wu | H01J 61/56 439/619 |
| 6,292,348 | B1 * | 9/2001 | Lin | H01G 2/065 361/272 |
| 6,580,182 | B2 * | 6/2003 | Janning | H01K 1/625 307/36 |
| 6,650,065 | B1 * | 11/2003 | Shieh | H01K 1/70 315/122 |
| 6,805,463 | B2 * | 10/2004 | Shieh | F21V 19/0005 362/288 |
| 7,279,809 | B2 * | 10/2007 | Janning | H05B 37/036 307/36 |
| 7,422,489 | B1 * | 9/2008 | Tseng | H01R 33/09 362/654 |
| 7,740,503 | B1 * | 6/2010 | Tsai | H01R 33/09 362/257 |
| 7,851,981 | B2 * | 12/2010 | Altamura | H05B 37/036 313/315 |
| 8,324,820 | B2 * | 12/2012 | Janning | H05B 33/0821 315/185 R |
| 2003/0123217 | A1 * | 7/2003 | Nakamura | H01G 9/008 361/520 |
| 2005/0190555 | A1 * | 9/2005 | Wu | F21S 4/10 362/277 |
| 2006/0145627 | A1 * | 7/2006 | Peng | H05B 37/036 315/185 S |
| 2008/0129214 | A1 * | 6/2008 | Janning | H05B 39/105 315/192 |
| 2009/0128042 | A1 | 5/2009 | Janning | |
| 2010/0195271 | A1 * | 8/2010 | Abe | H01G 9/12 361/519 |
| 2012/0081835 | A1 * | 4/2012 | Shimizu | H01G 2/06 361/306.1 |

* cited by examiner

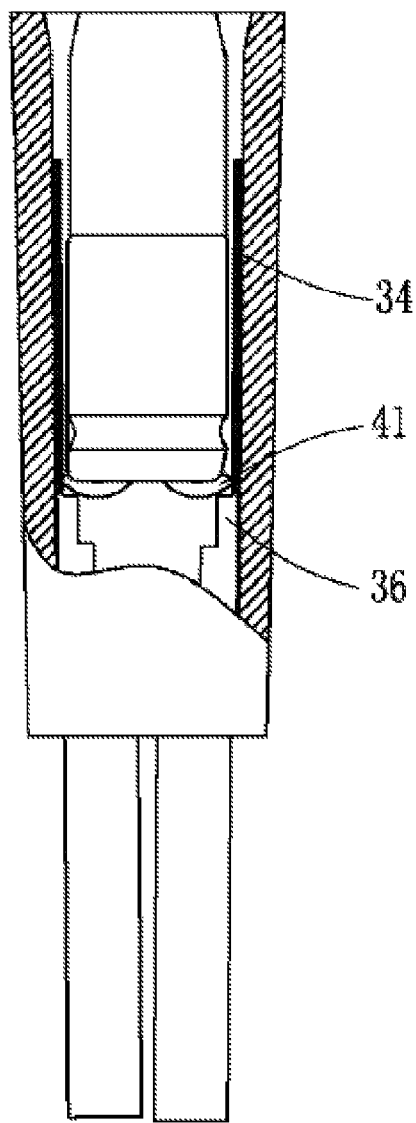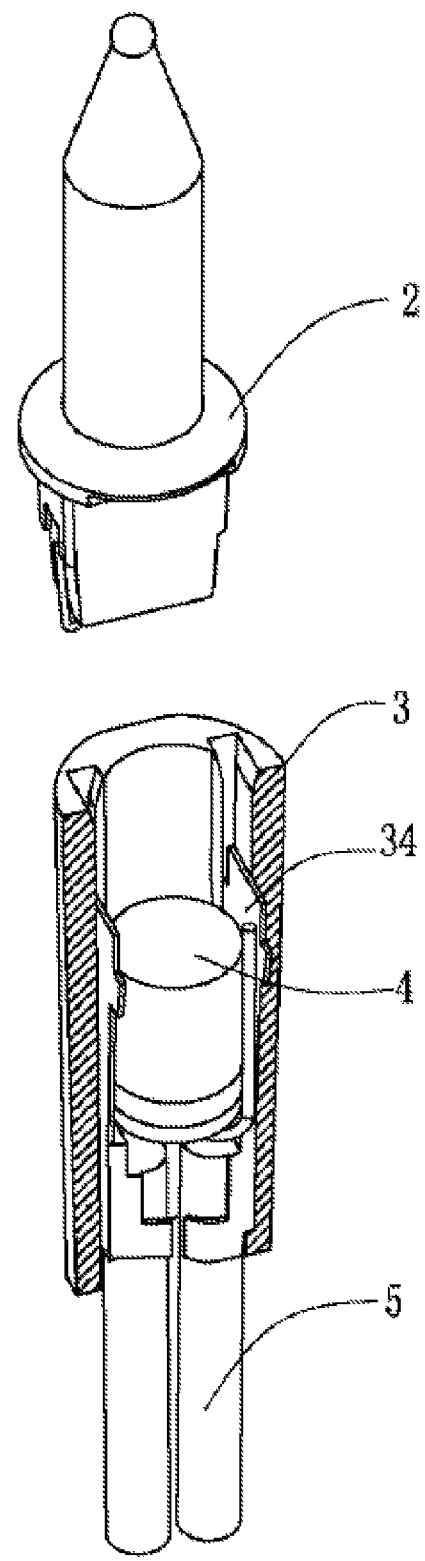
FIG. 4A
FIG. 4B

STRING LAMP

CROSS-REFERENCE TO RELATED APPLICATIONS

None.

BACKGROUND OF THE INVENTION

1. Field of the Invention

The present invention relates to a decorative light string, and particularly to a string lamp of a light string.

2. Description of Related Art

A string lamp is widely applied to indoor and outdoor decoration, and is a necessary ornament for holiday celebrations. The string lamp mainly means decorative lamps serially connected in a circuit. The string lamp is generally provided with a slender bulb, a lamp holder for fixing the bulb, and a connecting base for realizing electrical connection of the bulb and a wire. The existing string lamp has already realized the function that power supply of the circuit is not interrupted after the bulb is damaged or the lamp holder is separated from the connecting base through structural design and circuit design, so that the service life of the string lamp is greatly prolonged; for instance, a Christmas lamp disclosed by the Chinese patent with the patent number of CN201020275049.5. However, there are also many places which may be improved in the existing structural design, for example, the structure is not compact enough to easily cause poor electrical contact.

BRIEF DESCRIPTION OF THE SEVERAL VIEWS OF THE DRAWING(S)

The foregoing and other exemplary purposes, aspects and advantages of the present invention will be better understood in principle from the following detailed description of one or more exemplary embodiments of the invention with reference to the drawings, in which:

FIG. 4A is a schematic diagram of connection of conductive pieces, a capacitor and a connecting base with a part of the connecting base being cut off according to an embodiment of the present invention;

FIG. 4B is an explosive view of a string lamp with a part of the connecting base being cut off according to an embodiment of the present invention;

DETAILED DESCRIPTION OF THE INVENTION

Figure 1:
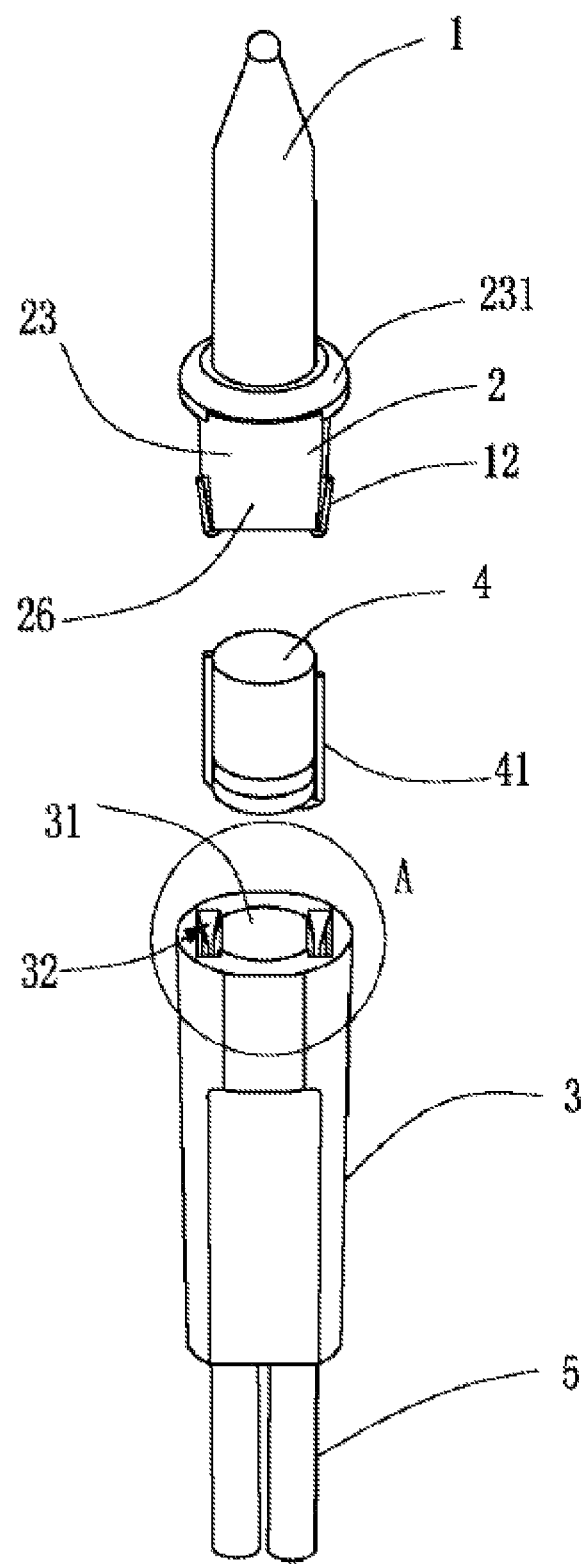
FIG. 1 is an explosive view of a string lamp according to an embodiment of the present invention.

The invention will now be described in detail through several embodiments with reference to the accompanying drawings.

As shown in FIG. 1 to FIG. 4, in an exemplary embodiment, the string lamp of the present invention is a small and compact decorative lamp in a long and thin shape, is mainly used for being serially connected with a plurality of lamps in same or similar structures to form a stripe lamp/light string, and is used for decorative purposes, especially for holiday lighting and landscape decoration.

Each lamp of the string lamp mainly includes a bulb 1, an insulated lamp holder 2, a connecting base 3 and a capacitor 4 used for being connected parallel to the bulb 1.

The bulb 1 may be a tungsten lamp or an LED (Light-Emitting Diode) lamp and is substantially cylindrical, and there are two lamp pins 12 extending out from a lower end of the bulb in the embodiment. Understandably, in other embodiments, different bulbs may be provided with different shapes and with lamp pins with different amounts, for instance, three or more lamp pins.

The lamp holder 2 includes a receiving part 23 for receiving and holding a lower part of the bulb 1, and a guide block 26 extending downwardly from a lower end of the receiving part 23. The receiving part 23 is hollow and defines an opening at the top so as to form a cavity for receiving the lower part of the bulb 1. The receiving part 23 is cylindrical and gradually shrinks from the top down, and an annular flange 231 is protruded outwards at a top edge of the receiving part 23.

The guide block 26 extends out from the lower end of the receiving part 23 integrally and has a fool proof design to be secured in the connecting base 3 easily. Specifically the guide block 26 is in a cylindrical to square transition shape, the upper part of the guide block 26 is cylindrical, and the bottom of the guide block 26 is square. In other embodiments, the guide block 26 may also be cylindrical. Two wire holes running through the guide block from the top down are formed in the interior of the guide block 26, and are respectively used for the lamp pins of the bulb to go through. The lamp pins 12 of the bulb 1 penetrate through the wire holes of the guide block 26, extend out from the two wire holes respectively, then are bent upwards respectively, and are tightly attached onto the two opposite outer walls of the guide block 26. In other embodiments, the guide block may be omitted, and the wire holes of the lamp holder 2 may be formed in the receiving part 23.

The capacitor 4 is an electrolytic capacitor with a high reverse breakdown voltage of 2~16 volts. A rated voltage of the capacitor is within a range from about 2V to about 100V and a capacitance of the capacitor is within a range from 2 μF to 250 μF. The capacitor 4 has a preferably cylindrical or at least substantially cylindrical body (with a top end, a bottom end opposite to the top end, and an outer side wall connecting the top end and the bottom end) and two connecting pins 41 extending out from a bottom end (bottom surface) of the body of the capacitor. A length of each connecting pin of the capacitor 4 is 2~15 millimeters, and preferably 4~15 millimeters. A width of the capacitor body is 4~12 millimeters. The connecting pins 41 firstly bent outwardly towards two opposite sides of the capacitor 4 respectively and are then bent upwards until being tightly attached to the outer side wall of the body of the capacitor 4.

The connecting base 3 is hollow and electrically insulating, the capacitor 4 and the lamp holder 2 is received in the connecting base 3 successively in a separable mode, and the capacitor 4 is arranged below the lamp holder 2. An inner wall defining a containing space at the upper part of the connecting base 3 is matched with the shape of the receiving part 23 of the lamp holder 2. Specifically, a cylindrical first containing groove 31 and two substantially rectangle second containing grooves 32 defined on opposite sides of the first containing groove 31 are formed in the connecting base 3. The first containing groove 31 and the second containing grooves 32 are communicated. The first containing groove 31 is mainly configured for receiving a lower part of the receiving part 23, the guide block 26, and the capacitor 4. The second containing grooves 32 are mainly configured for receiving the two conductive pieces 34, the two lamp pins 12 and the connecting pins 41 of the capacitor 4. When the lamp holder 2 and the capacitor 4 are arranged in the connecting base 3, the lamp pins 12 are clamped between the outer side wall of the lower part of the lamp holder 2 and the conductive pieces 34, and tightly electrical contact is realized between the lamp pins 12 and the conductive pieces 34. And, the connecting pins 41 are clamped between the outside wall of the capacitor 4 and the conductive pieces 34, and tightly electrical contact is realized between the outer side wall of the capacitor and the conductive pieces 34. Preferably, the connecting base 3 is internally provided with a boss 36 (see FIG. 4A) for limiting the lowest position of the capacitor 4 so as to prevent the capacitor from moving downwards. That is, the first containing groove receives and holds the capacitor 4 to prevent undesirable movement of the capacitor relative to an inner wall of the hollow connecting base 3.

Figure 2:
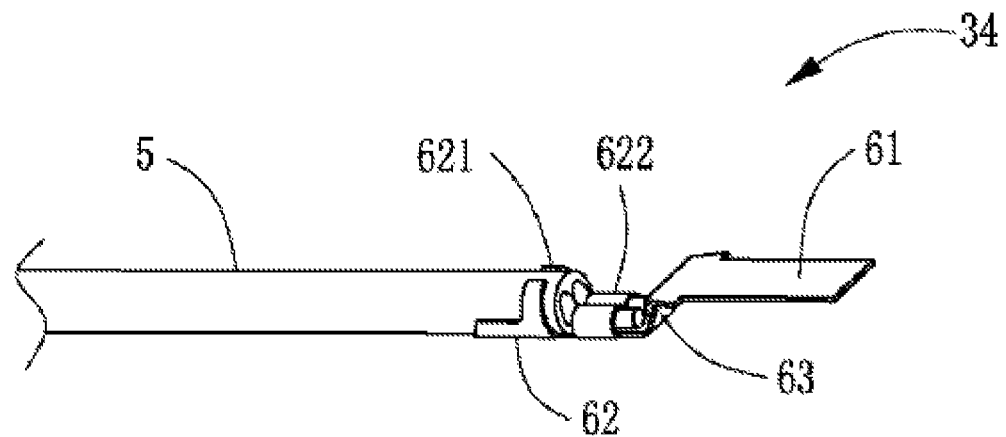
FIG. 2 is a schematic diagram of connection of a conductive piece and a wire of the string lamp according to an embodiment of the present invention.
Figure 3:
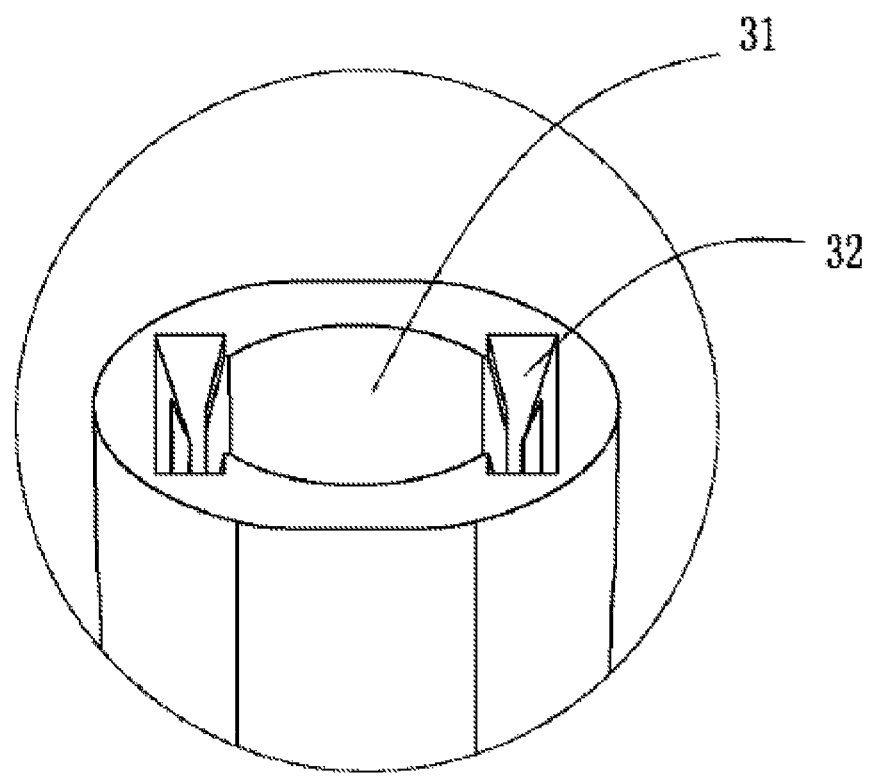
FIG. 3 is an enlarged view of part A of FIG. 1.

Please also refer to FIG. 2, each conductive piece 34 includes a first conductive part 61, a second conductive part 62, and a conductive connecting part 63 electrically connected with the first conductive part 61 and the second conductive part 62. Each connecting base 3 is internally provided with two oppositely arranged conductive pieces 34. Each first conductive part 61 is electrically contacted with a corresponding one of the two lamp pins 12 and a corresponding one of the two connecting pins 41. Normally, the two conductive pieces 34 do not electrically contact with each other, and the bulb and the capacitor are parallel connected. When the bulb is removed from the bulb holder, the capacitor electrically connects the two conductive pieces 34 to realize electrical connection. The capacitor is configured in the circuit without regarding to its polarity. The two second guide blocks 62 are used for being electrically connected with two wires 5 respectively.

In the embodiment, the first conductive part 61 is sheeted, in other words, is a metal plate, and is substantially arranged on the inner side wall of the connecting base 3 in parallel. The second containing grooves 32 are correspondingly formed in the inner side wall of the connecting base 3, and the bottoms of the second containing grooves 32 are provided with clamping baffles (not shown), thus the first conductive part 61 is prevented from sliding out of the second containing grooves, and attached to the inner side surface of the containing groove 32. The second conductive part 62 includes a substrate substantially parallel to the first conductive part 61 and two groups of embracing arms 621, 622 extending from opposite sides of the substrate towards the inner side wall of the connecting base 3. Each group of embracing arms includes two embracing arm extending from the two sides of the substrate, respectively. One group of embracing arms 621 is used for embracing a wire sleeved with an insulation sleeve, insulating paint is coated on the surface of the group of embracing arms 621, such that electric insulation between the wire and the conductive piece 34 is realized. The group of embracing arms 621 is arranged close to the tail end of the second conductive part 62 and far away from the conductive connecting part 63. The other group of embracing arms 622 is arranged close to the conductive connecting part 63, and is used for embracing exposed wires extending out from the inside of the insulation sleeve, thus electrical connection of the conductive piece 34 and the wire is realized. Preferably, free ends of the embracing arms 621 of the second conductive part 62 are positioned inside a plane where the first conducive part 61 is after embracing the wire 5, thus the wire 5 can be attached to the inner side wall of the connecting base 3 easily, while the substrate of the second conductive part 62 is separated from the inner side wall of the connecting base 3. The conductive connecting part 63 is smoothly connected between the first conductive part 61 and the second conductive part 62, and acts as an elastic component. The conductive pieces 34 are preferably made of sheet copper with certain hardness, and have certain properties of toughness and memory.

Figure 8:
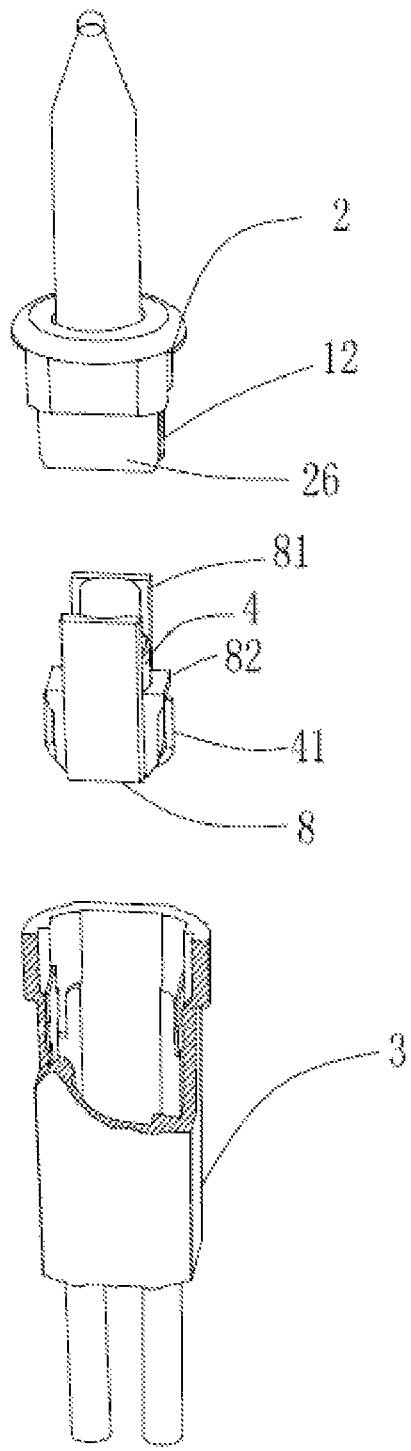
FIG. 8 is another schematic diagram of the string lamp in FIG. 7, with a part of the connecting base being cut off.
Figure 9:
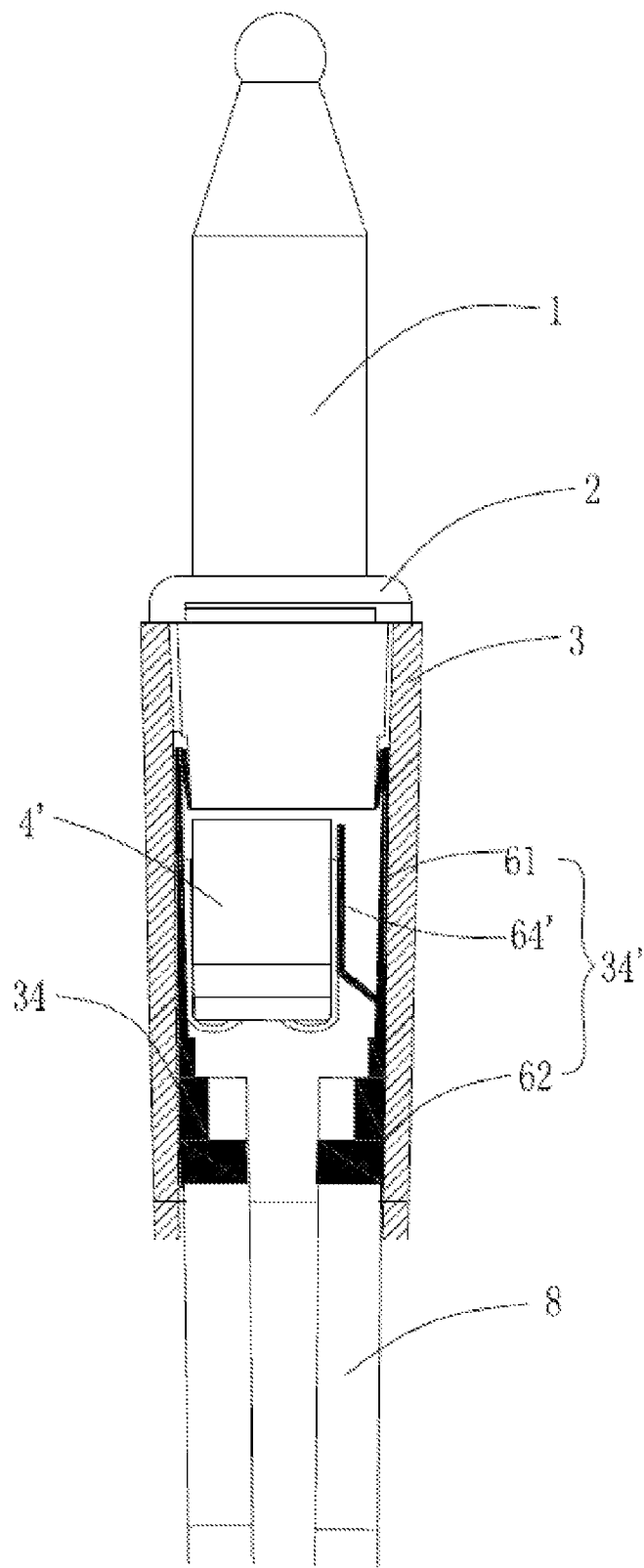
FIG. 9 is a perspective view of a string lamp in according to yet another embodiment of the present invention.

In other embodiment, the conductive connecting part 63 can be omitted, and the first conductive part 61 and the substrate of the second conductive part 62 are configured in a plane (at least see FIG. 8). Thus, the embracing arms 621, 622 extend from opposite sides of the substrate towards a middle axle of the connecting base 3, and the substrate of the second conductive part 62 contacts to the inner side wall of the connecting base 3.

Please also refer to FIG. 4A and FIG. 4B, in assembly, firstly, two conductive pieces 34 connected with two wires 5 respectively are inserted in the second containing grooves 32 from a bottom end of the connecting base 3 by pass through a cross-shaped opening (not shown) defined in the bottom end of the connecting base 3, and are blocked by edges which defines the cross-shaped opening. Then the capacitor 4 is inserted in the first containing groove 31 from the top of the connecting base 3, with the connecting pins 41 being inserted in the second containing grooves 32 respectively and contacting the conductive pieces 34. Finally, the lamp holder 2 with the bulb 1 installed therein is inserted in the first containing groove 31 from the top of the connecting base 3, with the lamp pins 12 being inserted in the second containing grooves 32 respectively and contacting the conductive pieces 34.

Figure 5:
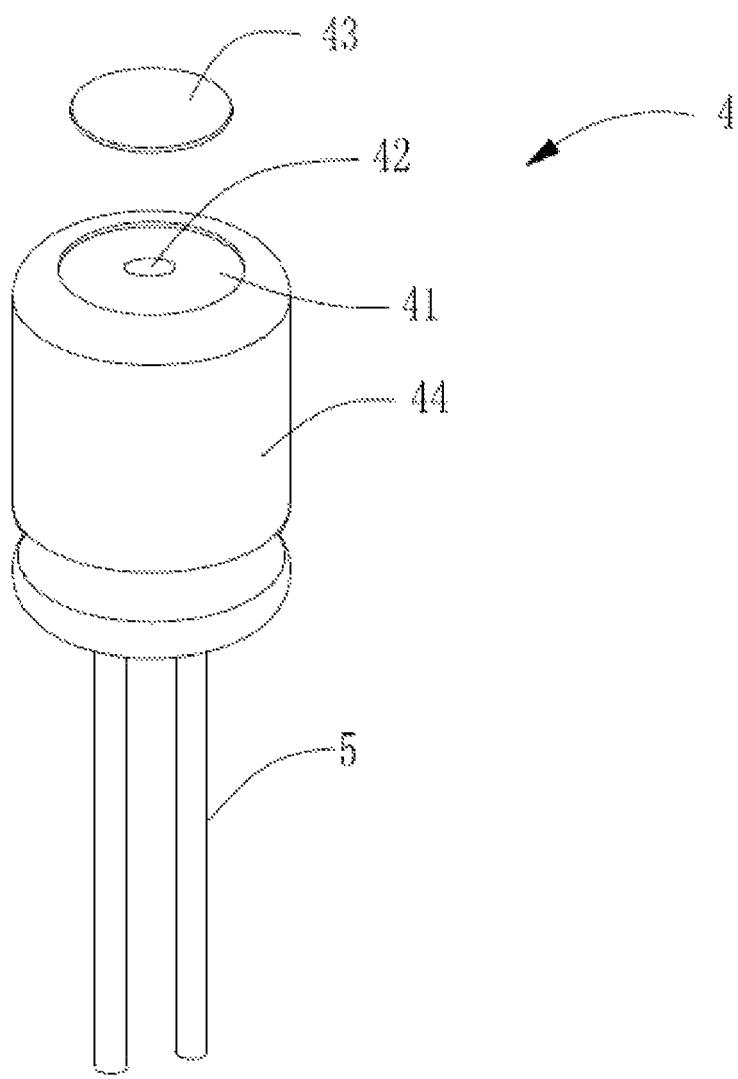
FIG. 5 is an exploded perspective view of a capacitor according to an embodiment of the present invention.
Figure 6:
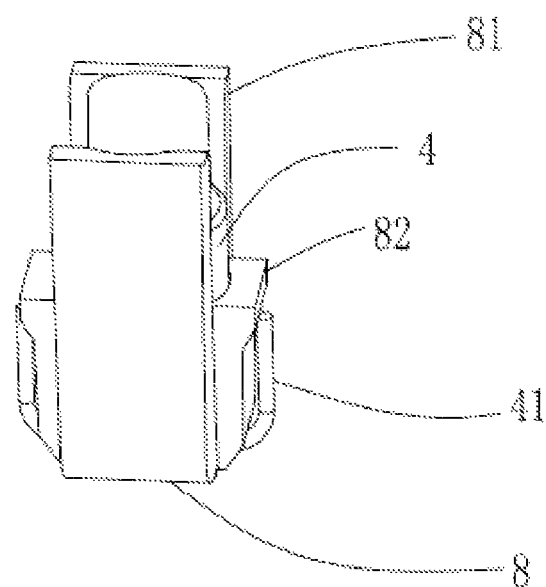
FIG. 6 is a perspective view of a fixed seat accommodating a capacitor in according to another embodiment of the present invention.
Figure 7:
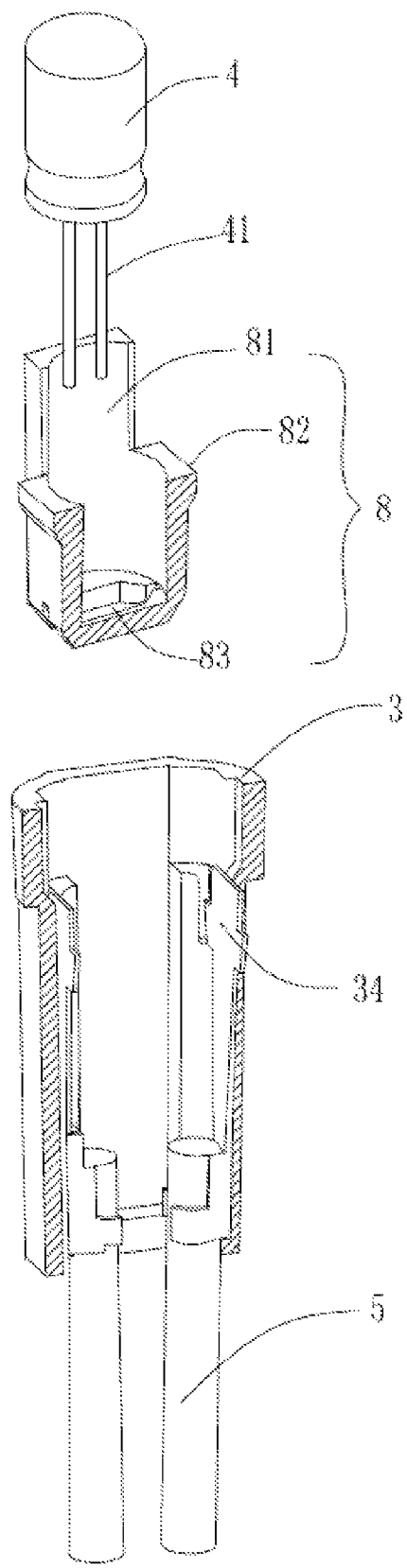
FIG. 7 is a schematic diagram of a string lamp with a part of the connecting base and a part of the lamp holder being cut off according to another embodiment of the present invention.

In the embodiment, a non-explosive capacitor could be utilized as shown in FIG. 5. The non-explosive capacitor 4 includes a substantially cylindrical metal case 41 for accommodating electrolyte. The two connecting pins 5 are extended out from a bottom end of the metal case 41 and are electrically connected with the metal case 41. An upper end of the metal case 41 defines an opening 42. The capacitor 4 also includes an electrical insulating cover plate 43 covering the opening 42, and an electrical insulating case 44 enclosing the metal case 41 except the cover plate 43 and the two connecting pins 5. The surface of the cover plate 43, facing the upper end of the metal case 41, is coated with glue or adhesive which is began to melt when its temperature reaches to 90~100 degrees Celsius. So, when the capacitor is over-heated and the temperature reaches to 90~100 degrees Celsius, the glue or adhesive between the cover plate 43 and the metal case 41 is melted, and the pressure within the metal case is released through the opening, the capacitor 4 will not exploded.

In the other embodiment, the cover plate may be omitted, and the opening may be sealed with glue or adhesive which is began to melt when its temperature reaches to 90~100 degrees Celsius. So, when the capacitor is over-heated and the temperature reaches to 90~100 degrees Celsius, the glue or adhesive is melted, and the pressure within the metal case is released, the capacitor 4 will not exploded.

In another embodiment, as shown in FIG. 6 to FIG. 9, the string lamp also includes a fixed seat 8 for accommodating the capacitor 4. The fixed seat 8 includes a substantially U-shaped clamping piece 81 and two second guide blocks 82 arranged on the two unsealed sides of the U-shaped clamping piece 81. The second guide blocks 82 are used for at least sealing the lower sides of the two unsealed sides of the clamping piece 81. A slot 83 (or two wire holes in other embodiment) for the connecting pins 41 of the capacitor 4 to extend out is formed in the bottom of the clamping piece 81. The connecting pins 41 are bent upwards after extending out from the slot 83 and are tightly attached to the outer side walls of the second guide blocks 82. The guide block 26 of the lamp holder 2 is inserted in the U-shaped clamping piece 81 so as to realize double fixing of the lamp holder 2. During assembling, the bulb is inserted in the lamp holder, the two lamp pins are tightly attached to the outer wall of the lamp holder upwards from the two sides respectively by bending the lamp pins, the capacitor is inserted in the fixed seat, and the connecting pins 41 are bent upwards from the two sides respectively and are tightly attached to the outer wall of the fixed seat. Then, the fixed seat and the lamp holder are inserted in the connecting base successively.

In the above-mentioned embodiments, a width of the capacitor 4 is substantially the same as an inner diameter of the first containing groove 31. In a further another embodiment, an improved conductive piece 34' and a normal conductive piece 34 are provided for a smaller size capacitor, exactly, for a capacitor 4' with smaller width than the inner diameter of the first containing groove 31. The conductive piece 34' further includes an elastic metal tab 64' extended from the first conductive part 61 or the second conductive part 62 towards the outside wall of the capacitor 4' and the free end of the elastic metal tab 64' abuts on the connecting pins of the capacitor 4' to realize electrical connection. The capacitor 4' is clamped tightly between the normal conductive piece 34 and the elastic metal tab 64' of the conductive piece 34'. The elastic metal tab 64' and the corresponding one of the connecting pins of the capacitor 4' can be welded together.

The string lamp of the present invention is compact in structure; the capacitor and the lamp holder are both arranged in the connecting base in a separable mode, so that the capacitor and the lamp holder are convenient to maintain and replace. The capacitor and the lamp pins are clamped between a body and the conductive pieces to realize electrical connection, so that good electrical connection is guaranteed. In conclusion, the string lamp of the present invention has the advantages of being thin and long in size, small and compact, attractive in appearance, few in raw materials, low in cost and good in electrical contact, and the bulb and the capacitor can be effectively tightened.

While the invention has been described in terms of several exemplary embodiments, those skilled on the art will recognize that the invention can be practiced with modification within the spirit and scope of the appended claims. In addition, it is noted that, the Applicant's intent is to encompass equivalents of all claim elements, even if amended later during prosecution.

What is claimed is:

1. A string lamp, comprising: a bulb with two lamp pins extending out from a lower end thereof; a lamp holder configured for receiving and holding a lower part of the bulb and defining at least one wire hole in a lower part thereof, the two lamp pins passing through the at least one wire hole; a capacitor with two connecting pins extending out from a bottom end thereof, the two connecting pins being folded outwardly towards opposite sides of the capacitor firstly and then upwardly to attach an outside wall of the capacitor; two separately arranged conductive pieces, each of which electrically connected to a wire; and a hollow connecting base configured for accommodating the two conductive pieces and detachably receiving the capacitor and at least a part of the lamp holder; wherein each conductive piece is electrically contacted with a corresponding one of the two lamp pins and a corresponding one of the two connecting pins, so as to realize parallel connection of the bulb and the capacitor; the capacitor and the lamp holder is configured in the connecting base in a separably embedded mode, wherein the capacitor is substantially cylindrical and is configured under the lamp holder, the hollow connecting base defines a substantially cylindrical cavity for receiving and holding the capacitor to prevent undesirable movement of the capacitor relative to an inner wall of the hollow connecting base, each connecting pin of the capacitor is clamped between the outside wall of the capacitor and a corresponding one of the two conductive pieces, and wherein the capacitor is an electrolytic capacitor with a high reverse breakdown voltage 2~16 volts, wherein the string lamp further comprises a fixed seat configured for containing the capacitor, wherein the fixed seat comprises a substantially U-shaped clamping piece configured for being inserted by a low part of the lamp holder and two second guide blocks arranged on two unsealed sides of the U-shaped clamping piece, a slot or two wire holes for the connecting pins of the capacitor to extend out are formed in the bottom of the U-shaped clamping piece or the lower parts of the two second guide blocks, and the connecting pins are bent upwards after extending out from the slot or the two wire holes and are tightly attached to outside walls of the second guide blocks.

2. The string lamp of claim 1, wherein a length of each connecting pin of the capacitor is 2 to 15 millimeters.

3. The string lamp of claim 1, wherein a length of each connecting pin of the capacitor is 4 to 15 millimeters, a width of the capacitor is 4~12 millimeters.

4. The string lamp of claim 1, wherein the lower part of the lamp holder is inserted in the U-shaped clamping piece.

5. The string lamp of claim 4, wherein the hollow connecting base defines a receiving cavity for receiving and holding the fixed seat to prevent undesirable movement of the fixed seat relative to an inner wall of the hollow connecting base.

6. The string lamp of claim 1, wherein the capacitor is substantially cylindrical; a cylindrical first containing groove and two substantially rectangle second containing grooves communicating with the first containing groove are formed in the connecting base; the first containing groove is configured for receiving a lower part of the lamp holder and the capacitor; and each second containing groove is configured for receiving a corresponding one of the two conductive pieces, a corresponding one of the two lamp pins and a corresponding one of the two connecting pins of the capacitor.

7. The string lamp of claim 6, wherein each conductive piece comprises a first conductive part and a second conductive part connected with the first conductive part, the first conductive part is sheeted and is substantially arranged on the inner side wall of the connecting base, and the bottoms of the second containing grooves are provided with clamping positions, thus the first conductive part is prevented from sliding out of the containing grooves; the second conductive part comprises a substrate substantially parallel to the first conductive part and embracing arms extending from opposite sides of the substrate to the inner side wall of the connecting base; the embracing arms are used for embracing a wire and are electrically connected with the wire; and each conductive piece also comprises a conductive connecting part for connecting the first conductive part and the second conductive part in a sliding mode.

8. The string lamp of claim 6, wherein each conductive piece comprises a first conductive part and a second conductive part connected with the first conductive part, the first conductive part is sheeted and is substantially arranged on the inner side wall of the connecting base; the second conductive part comprises a substrate substantially parallel to the first conductive part and embracing arms extending from opposite sides of the substrate towards a middle axle of the connecting base; the embracing arms are used for embracing a wire and are electrically connected with the wire.

9. The string lamp of claim 8, wherein a width of the capacitor is smaller width than that of an inner diameter of the first containing groove; at least one of the conductive piece further comprises an elastic metal tab extended from the first conductive part or the second conductive part towards the outside wall of the capacitor and a free end of the elastic metal tab abuts on a corresponding one of the two connecting pins of the capacitor to realize electrical connection.

10. The string lamp of claim 9, wherein the elastic metal tab and the corresponding one of the connecting pins of the capacitor is welded together.

11. The string lamp of claim 1, wherein the connecting base is internally provided with a boss for limiting the lowest position of the capacitor.

* * * * *